No. 694,303. Patented Feb. 25, 1902.
B. BESKOW.
TRACTION WHEEL.
(Application filed June 28, 1901.)
(No Model.) 2 Sheets—Sheet 2.
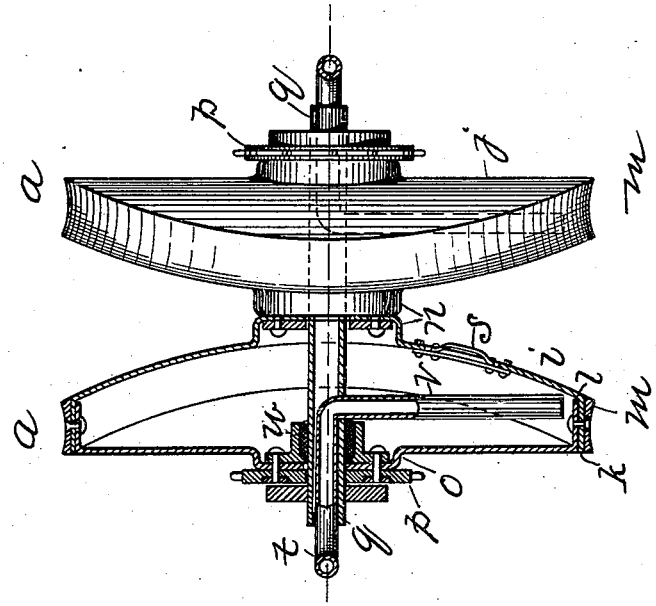
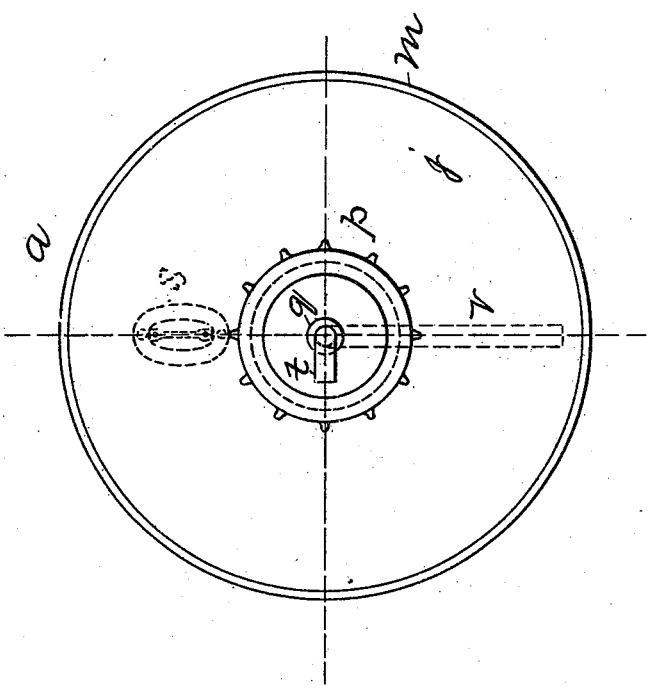

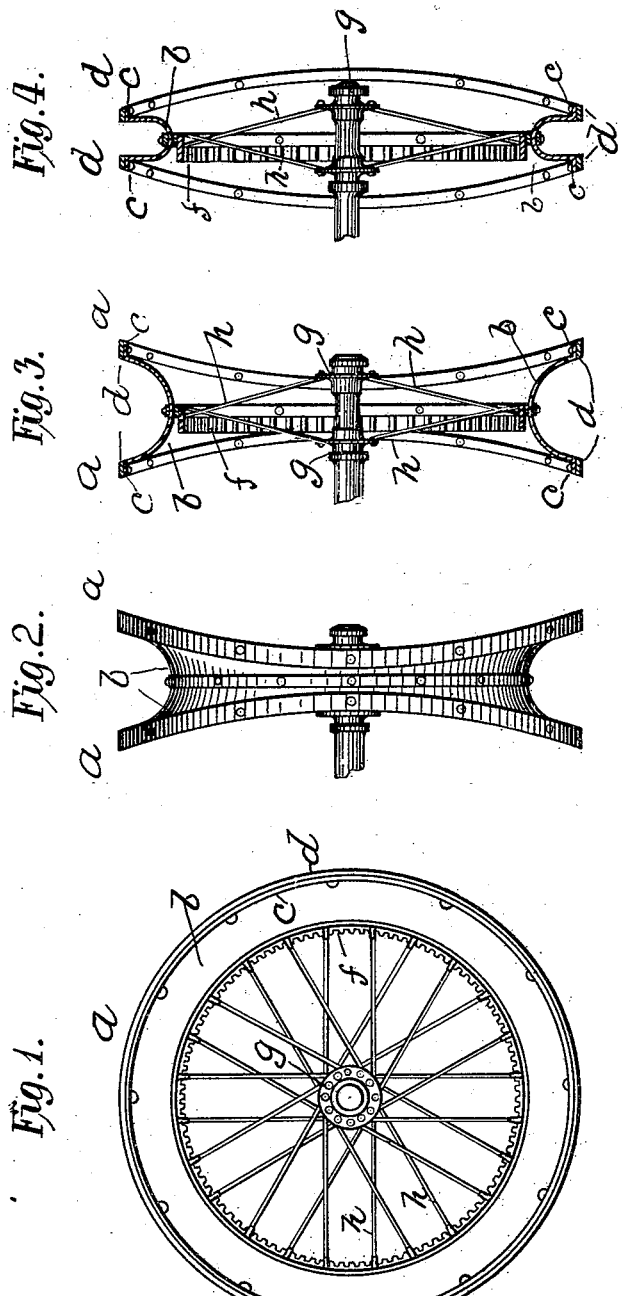

UNITED STATES PATENT OFFICE.

BERNHARD BESKOW, OF STOCKHOLM, SWEDEN.

TRACTION-WHEEL.

SPECIFICATION forming part of Letters Patent No. 694,303, dated February 25, 1902.

Application filed June 28, 1901. Serial No. 66,382. (No model.)

*To all whom it may concern:*

Be it known that I, BERNHARD BESKOW, a subject of the King of Sweden and Norway, and a resident of Stockholm, Sweden, have invented certain new and useful Improvements in Traction-Wheels, of which the following is a specification.

My invention consists of an improvement in vehicle-wheels, especially traction-wheels, but also applicable to road-wheels generally, whereby the tractive power of the wheels is greatly increased, and they improve the surface of the road.

My invention consists in a laterally-sinuous construction of the tread, whereby instead of rolling in straight lines they proceed in continually-changing lines that are oblique to the direct course of the vehicle, and thus have greater tractive power and at the same time distribute the tracking effects laterally and so that the tracks of successive wheels cross each other in zigzag lines, making it impossible to follow in ruts, and thus always smoothing and improving the roadway; and my invention also consists of a duplex construction of such wheels, whereby the lateral divergences of the treads from the middle plane are balanced, so as to avoid divergent stresses on the axle, as hereinafter described, reference being made to the accompanying drawings, in which—

Figure 1 is a side elevation of my improved wheel in one form of construction. Fig. 2 is a front elevation of the duplex sinuous-tread construction. Fig. 3 is a central vertical section of the wheel as represented in Fig. 2. Fig. 4 is a central horizontal section of the wheel as shown in Fig. 2. Fig. 5 is a side view of said wheel in a modified form of construction. Fig. 6 is partly a vertical central section and partly a front elevation of the wheel as represented in Fig. 5.

The essential feature of the invention consists of the laterally-sinuous construction of the tread $a$, whatever the rest of the construction may be and whether a single tread or duplex treads be employed; but it is regarded as important to employ the duplex tread, as shown, in which the lateral divergences of the two coincide reversely, and thus balance in respect of the lateral stresses.

For general purposes the particular construction is immaterial. In Figs. 1 to 4, inclusive, I represent a stamped sheet-metal rim $b$, grooved circumferentially in the face, with the margins $c$ flanged outwardly parallel with the axis, said rim being alternately wide and narrow in different diameters, and each flange $c$ is reinforced with a metal tire $d$, riveted on. An internally-toothed rim $f$ is riveted to the inner periphery of the rim $b$ for driving purposes, and the usual ball-bearing hub $g$ and wire spokes $h$ are represented.

In Figs. 5 and 6 I represent the construction of the respective parts of the duplex wheel as being in two stamped or pressed parts $i$ and $j$, of sheet or plate metal, with telescopic flanges $k$ and $l$, inserted one within the other, with a tread $m$, applied outside and all riveted together, said parts being formed with suitable hub-bosses $n$ and $o$ for being connected together at one side and for the connection of sprocket-wheels $p$ or other driving-gear outside and also for being fitted to an axle $q$. The stamping or pressing dies employed for shaping the parts $i\ j$ have the requisite form for producing the sinuous treads of like character as in the other construction of Figs. 1 to 4. In this construction of Figs. 5 and 6 the respective parts of the duplex wheel are separable and usable as independent wheels on opposite sides of the vehicle, if desired.

The treads may be concave in cross-section, as shown, if desired, which in connection with the diverging runs of the treads on the ground add powerfully to the tractive grip of the wheels. Such hollow construction of the wheels is a feature of invention contrived by me for a favorable means of carrying water and liquid fuel in such automobile vehicles as employ these elements in connection with the motive force, and for this purpose I construct them with any suitable hand-hole opening and cover, as $s$, for introducing the supplies, and with a suction-pipe $t$, entering the interior space through the hollow axle $u$ and having therein a drop-section $v$, by which to pump out the liquid as required for use.

Any suitable packing may be applied around the axle, as indicated at $w$, if required.

What I claim as my invention is—

1. A vehicle-wheel having a duplex laterally-sinuous tread in which the lateral sinuosities of the respective parts coincide reversely.

2. A vehicle-wheel having a laterally-sinuous tread, and consisting of two stamped or pressed cup-shaped parts connected by inserting the flange of one part within the flange of the other part, said parts being coincidently divergent sinuously.

Signed at New York city this 12th day of June, 1901.

BERNHARD BESKOW.

Witnesses:
C. SEDGWICK,
ERNST LUNDGREN.